(12) United States Patent
Loehndorf et al.

(10) Patent No.: US 7,472,587 B1
(45) Date of Patent: Jan. 6, 2009

(54) TIRE DEFORMATION DETECTION

(75) Inventors: Markus Loehndorf, Munich (DE); Horst Theuss, Wenzenbach (DE); Matthias Karl Robert Hawraneck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/856,725

(22) Filed: Sep. 18, 2007

(51) Int. Cl.
*G01M 17/02* (2006.01)
(52) U.S. Cl. .................................. 73/146; 73/146.3
(58) Field of Classification Search ............... 73/146, 73/146.3
See application file for complete search history.

(56) References Cited

U.S. PATENT DOCUMENTS

| | | | |
|---|---|---|---|
| 4,258,567 A | * | 3/1981 | Fisher, III .................. 73/146 |
| 4,830,461 A | | 5/1989 | Ishiharada et al. |
| 2002/0166371 A1 | * | 11/2002 | Ratti et al. .................... 73/146 |
| 2003/0046992 A1 | * | 3/2003 | Caretta ...................... 73/146 |
| 2004/0216520 A1 | * | 11/2004 | Caretta ...................... 73/146 |
| 2005/0044945 A1 | * | 3/2005 | Hammerschmidt ........... 73/146 |
| 2006/0283241 A1 | * | 12/2006 | Hammerschmidt ........ 73/146.3 |
| 2007/0213953 A1 | * | 9/2007 | Kitazaki et al. ............. 702/157 |
| 2007/0272006 A1 | * | 11/2007 | Demaie et al. ................ 73/146 |

FOREIGN PATENT DOCUMENTS

DE 19804991 A1 8/1999

* cited by examiner

*Primary Examiner*—Andre J Allen

(57) ABSTRACT

Embodiments of the invention are related to systems, methods, and apparatuses for detecting tire deformation. In one embodiment, a tire deformation detection system comprises a deformation detection structure, a transmitter, and receiver. The deformation detection structure can be mounted in a tire and configured to detect mechanical deformation of the tire. The transmitter can be configured to transmit data related to the mechanical deformation. The receiver can be configured to receive the data.

24 Claims, 7 Drawing Sheets

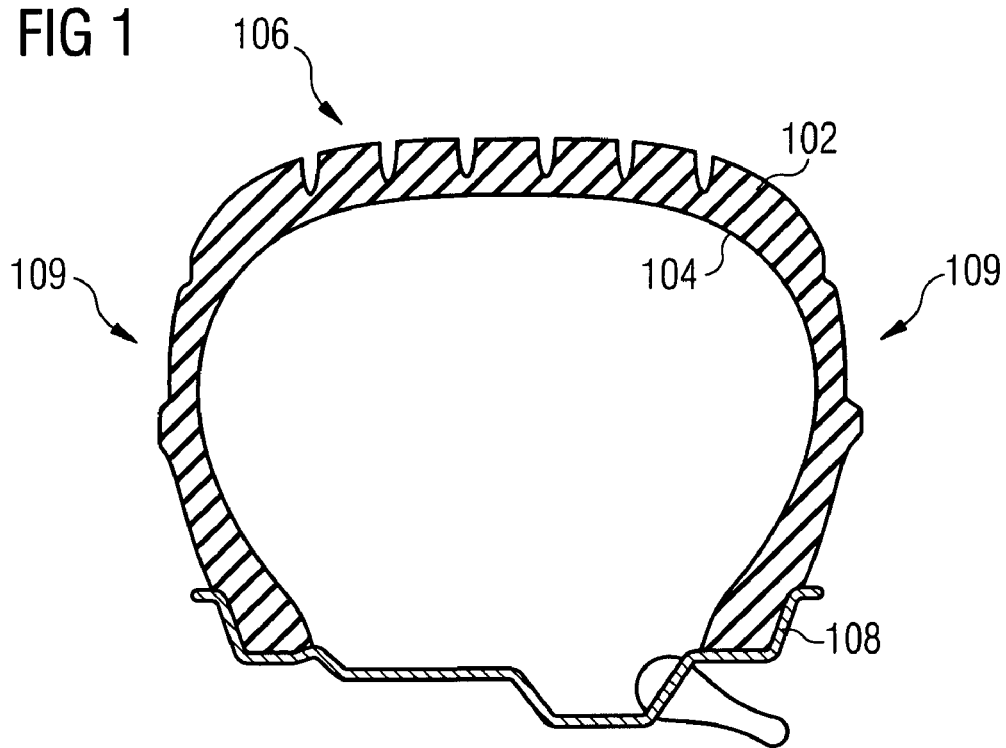
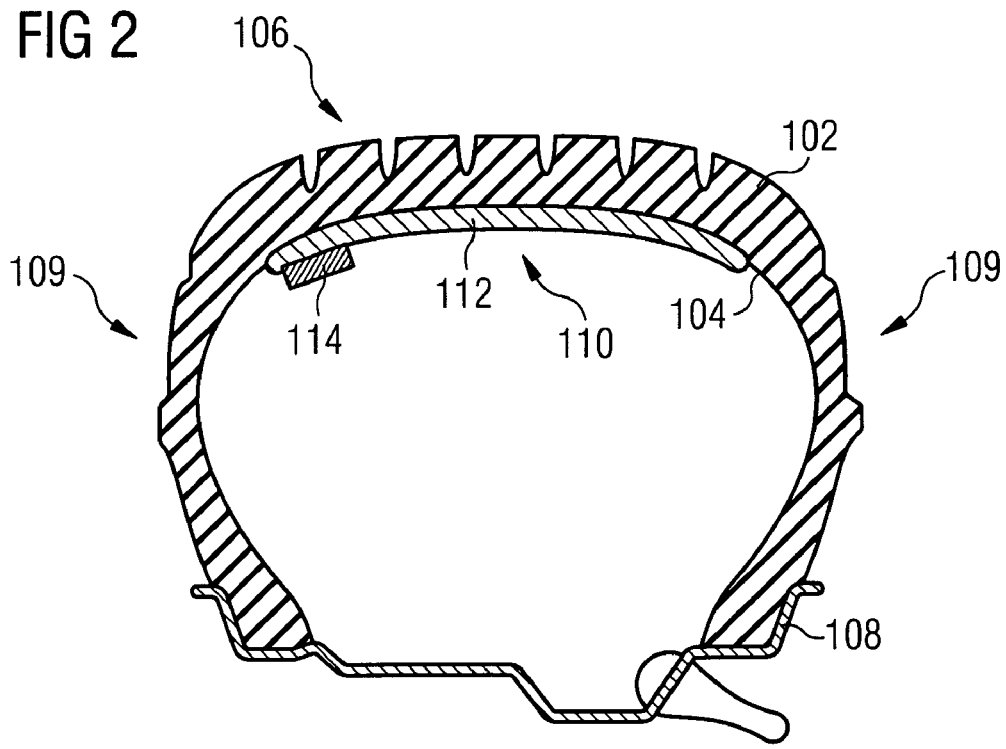

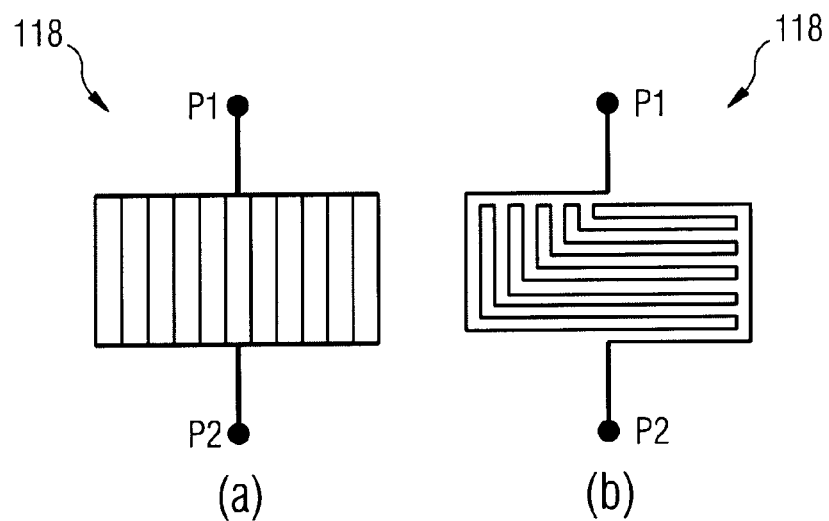
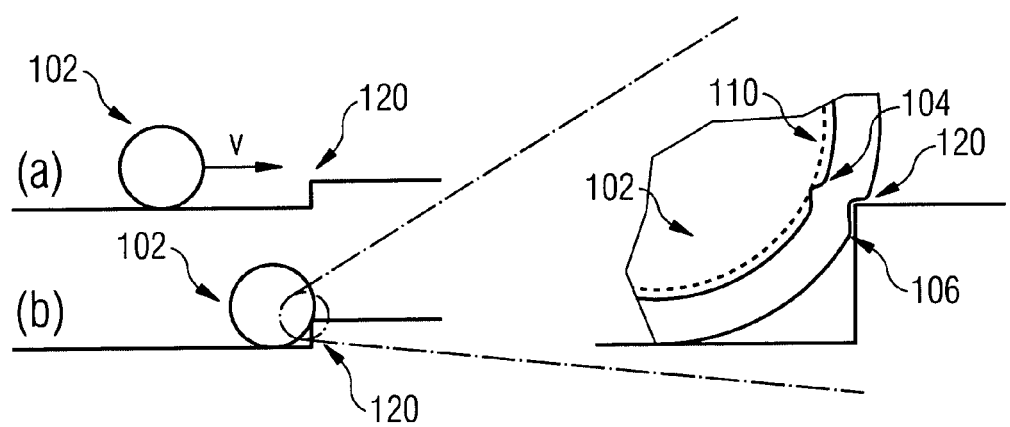

TIRE DEFORMATION DETECTION

FIELD OF THE INVENTION

The invention generally relates to tire deformation detection. More particularly, the invention relates to vehicle tire deformation detection using structures applied to or embedded within tires.

BACKGROUND OF THE INVENTION

Tire deformation can result from a variety of events encountered in normal driving conditions, such as an overloaded vehicle, an under- or over-inflated tire, a pothole or uneven roadway, or a nail or other obstruction, among others. Tire deformation can also be a symptom of age, lack of proper maintenance, and normal vehicle and tire usage. In some cases, gradual failure of or permanent damage to a tire can result, weakening or destroying the tire. In more serious cases, catastrophic failure in the form of a tire blow-out during use can occur. In any of these cases, vehicle and passenger safety are compromised.

Typically, tire deformation can be detected, monitored, and measured by applying special sensors, such as acceleration or magnetic, to the tire; by using photo detection methods, such as high-speed cameras and pressure sensor arrays in a roadway, external to the tire; or by using other methods or systems, such as ultrasonic. Such systems can be limited by cost, reduced or unavailable accuracy and effectiveness over the entire tire, and lack of applicability to a wider array of observable tire conditions.

SUMMARY OF THE INVENTION

Embodiments of the invention are related to systems, methods, and apparatuses for detecting tire deformation. In one embodiment, a tire deformation detection system comprises a deformation detection structure, a transmitter, and receiver. The deformation detection structure can be mounted in a tire and configured to detect mechanical deformation of the tire. The transmitter can be configured to transmit data related to the mechanical deformation. The receiver can be configured to receive the data.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which:

FIG. 1 depicts a cross-section of a tire according to an embodiment of the invention.

FIG. 2 depicts a cross-section of a tire according to an embodiment of the invention.

FIG. 4 depicts load structures according to embodiments of the invention.

FIG. 5 depicts a diagram of a tire according to an embodiment of the invention.

Figure 3:
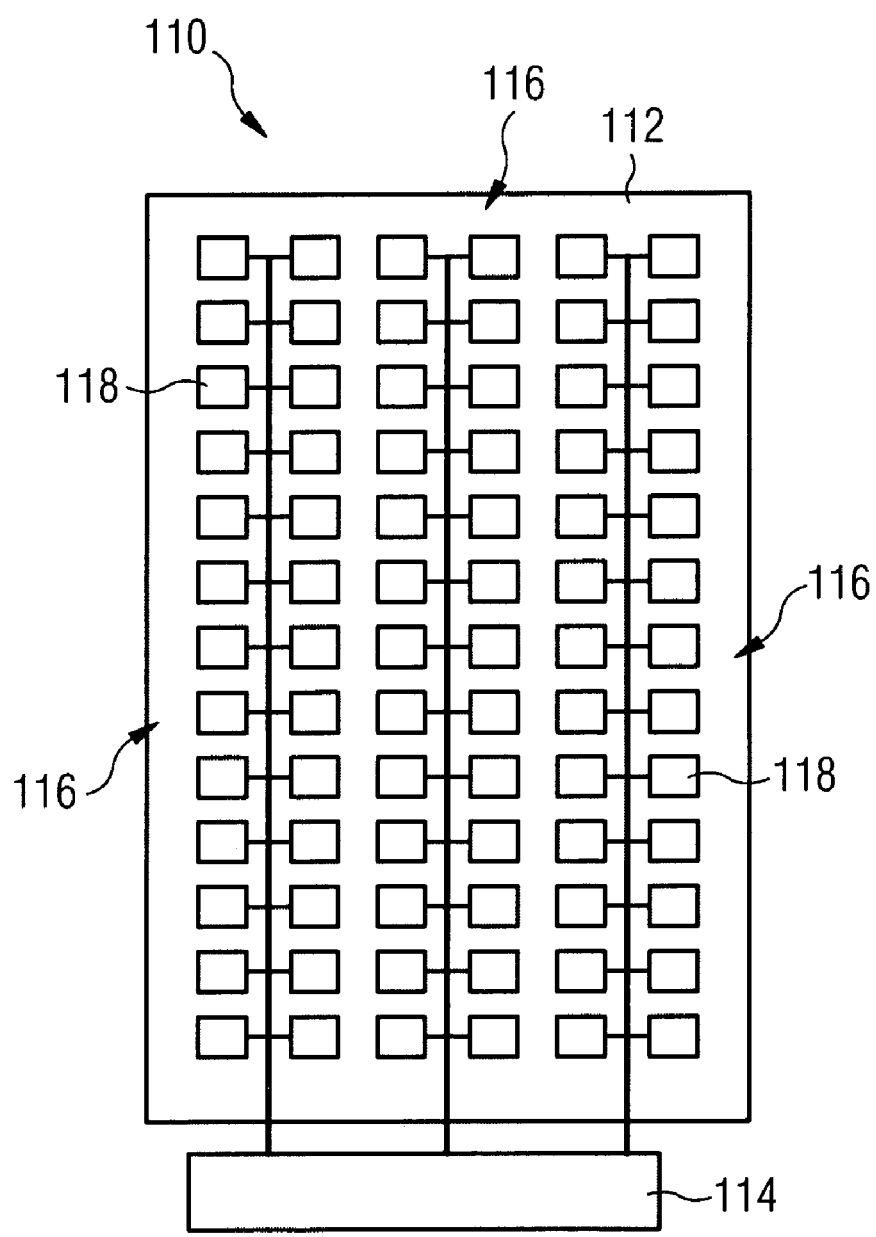
FIG. 3 depicts a deformation detection structure according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is related to tire deformation detection using structures applied to or embedded within a tire. Embodiments of the invention can be implemented in various vehicle tires and wheels, such as those on cars, trucks, semi-trucks, SUVs, buses, motorcycles, and others. Various embodiments of the invention can provide accurate and reliable real-time information about a variety of tire characteristics and conditions, thereby improving passenger and vehicle safety.

In embodiments of the invention, tire deformation and other conditions can be detected by a deformation detection structure. In one embodiment, the deformation detection structure can be applied or coupled to the inner surface or inner liner of the tire, such as by an adhesive, fastener, or other means. In another embodiment, the deformation detection structure can be coupled to or embedded within the tread region of the tire. In yet another embodiment, the deformation detection structure can be integrated with or embedded within the tire itself.

In one embodiment, the tire deformation detection structure comprises a detector layer. The detector layer comprises a sensor array including a plurality of sensor elements adapted to sense a deformation or other change in the tire in one embodiment. In another embodiment, the deformation detection structure comprises an optical waveguide structure in another embodiment. The optical waveguide structure is adapted to detect mechanical deformations of the tire from changes in amplitude or phase of light propagating in the waveguide structure.

The invention can be more readily understood by reference to FIGS. 1-12 and the following description. While the invention is not necessarily limited to the specifically depicted application(s), the invention will be better appreciated using a discussion of exemplary embodiments in specific contexts.

Referring to FIG. 1, a vehicle wheel typically comprises a tire 102 including an inner liner that lines the inside 104 of tire 102, multiple ply layers over the inner liner, and one or more steel belts over the ply layers. A cushion layer and a base layer are situated over the steel belts and a cap layer, also referred to as the tread layer 106, is situated on the outside of tire 102 over the base layer. Tread 106 interacts with the road surface to provide traction. The entire tire structure is then mounted on a rim 108 coupled to an axle of the vehicle. The side portions of tire 102 are referred to as sidewalls 109.

Referring to FIG. 2, a cross-section of tire 102 is shown, and affixed at an inner portion 104 of tire 102 is a deformation detection system 110 according to an embodiment of the invention. In FIG. 2, deformation detection system 110 is sized and affixed to substantially align with a footprint or contact area of tire 102, generally the internal portion 104 of tire 102 corresponding to tread area 106. In other embodiments, deformation detection system 110 can extend over a portion or all of sidewall area 109 of tire 102. Sidewall area 109 can be affected, for example, when a vehicle is turning or comes into contact with a surface or object other than a generally flat or smooth driving surface, such as a curb, pothole, or pavement edge.

In one embodiment, deformation detection system 110 comprises a detector layer 112 coupled to a sensor 114, which are depicted in more detail in FIG. 3. Detector layer 112 can comprise a film, foil, adhesive, plastic, metal, composite, or other material and can be affixed or coupled to tire 102 during or after the manufacture of tire 102. At least one stress detection array 116 is arranged on detector layer 112. In the embodiment of FIG. 3, deformation detection system 110 comprises three stress detection arrays 116. Each stress detection array 116 comprises a plurality of individual, interconnected load structures 118 in one embodiment and is coupled to sensor 114. The number, size, shape, and configuration of stress detection arrays 116 can vary in other embodiments.

Referring to FIG. 4, each load structure 118 can comprise one of a parallel resistive circuit structure between P1 and P2 shown at (a) or a series resistive circuit structure between P1 and P2 shown at (b). A single detector layer 112 can combine a combination of both configurations of load structures 118 shown at (a) and (b). Each individual load structure 118, and therefore detector layer 112 as a whole, is sensitive to changes in tire 102 related to vehicle load, road conditions, tire conditions, environmental conditions, and other factors. The sensitivity of load structures 118 can include a temporary deformation of one or more load structures 118 or a breakage of one or more load structures 118 or of an interconnection within stress detection array 116, altering a resistance of the array 116. Referring again to FIG. 3, sensor 114 is a resistance sensor in one embodiment configured to sense a resistance of stress detection array 116. A temporary deformation or permanent breakage with one or more load structures 118 and stress detection array 116 can therefore be detected by sensor 114 as an indication of deformation, damage, or some other irregularity related to tire 102.

For example, and referring to FIG. 5, tire 102 can encounter an obstruction or surface irregularity 120 when traveling at a velocity V in the direction shown at (a). In the detail view of (b), the contact between an external surface of tire 102, such as tread area 106, and irregularity 120 is transferred to inner portion 104, to which deformation detection structure 110 is affixed. The deformation caused by the stress introduced from the contact between tire 102 and irregularity 120 deforms deformation detection system 110 by influencing one or more load structures 118. The influence on load structures 118 alters a resistance of one or more arrays 116, and the change in resistance can be sensed by sensor 114. As previously mentioned, arrays 116 and individual load structures 118 can temporarily or elastically deform following an event such as that depicted in FIG. 5 in one embodiment. In other embodiments, arrays 116 or structures 118 can permanently break, by design or because of the severity of the deformation event. In such cases, all or part of detection system 110 can be repaired or replaced. In many situations, the deformation will cause permanent damage to tire 102 such that a replacement tire 102 is also required.

Figure 6:
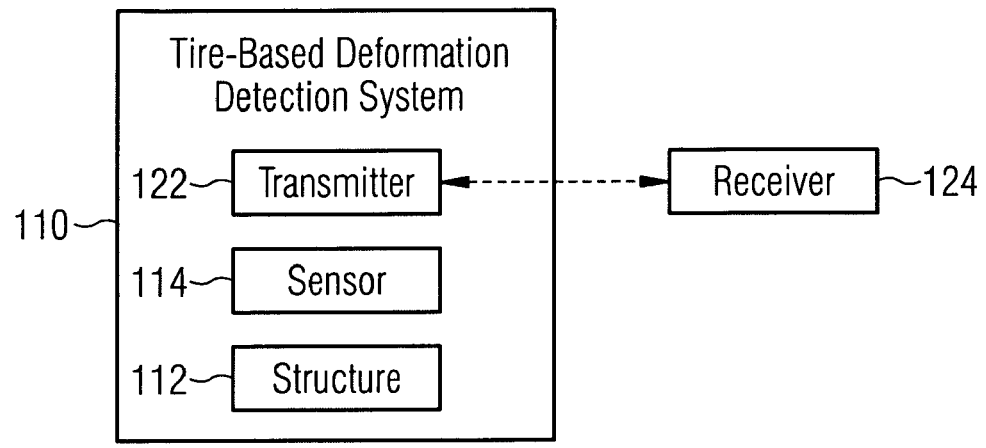
FIG. 6 depicts a block diagram according to an embodiment of the invention.

The detected change in resistance can then be communicated by sensor 114 to a location external to tire 102 so that the information can be processed and reported to a driver or vehicle operator. Referring to FIG. 6, deformation detection system 110, based in one or more vehicle tires, such as tire 102, includes detector layer 112 coupled to sensor 114. As previously described, detector layer 112 comprises at least one stress detection array 116 and load structures 118. Sensor 114 is coupled to or integral with a transmitter 122, such as a radio frequency (RF) or other suitable transmitter, adapted to communicate with a receiver 124 located external to tire 102. In one embodiment, transmitter 122 can be integrated with sensor 114 to communicate directly with receiver 124. In other embodiments, an additional transmitter (not shown) can be mounted intermediate transmitter 122 and receiver 124, such as in a wheel well or other location, to hop signals between transmitter 122 and receiver 124. In these embodiments, transmitter 122 can comprise a short-range transmitter to reduce the power needed to transmit signals from within tire 102. Although not shown, tire-based detection system 110 comprises a power supply, such as a battery, energy harvester or scavenger, or other source, the useful life of which can be of concern in order to maintain system reliability and dependability. Thus, reducing power consumption of tire-based components is generally desired.

Figure 7:
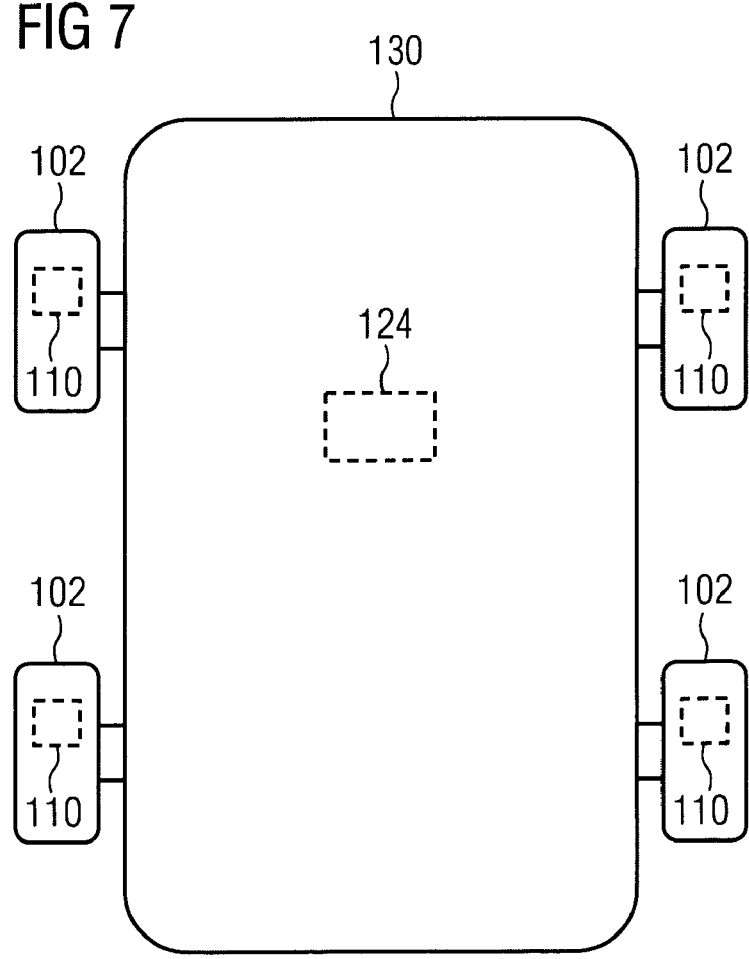
FIG. 7 depicts a block diagram of a vehicle and deformation detection system according to an embodiment of the invention.

Referring to FIG. 7, receiver 124 can be mounted in a vehicle 130 and adapted to communicate with detection systems 110 in a one, some, or all vehicle tires 102. In other embodiments, receiver 124 can be mounted external to a vehicle. When a signal is received by receiver 124 from sensor 114 reporting deformation or some other condition related to tire 102, receiver 124 can in turn alert a driver or operator via a dashboard indicator or other visual or audible warning.

Figure 8:
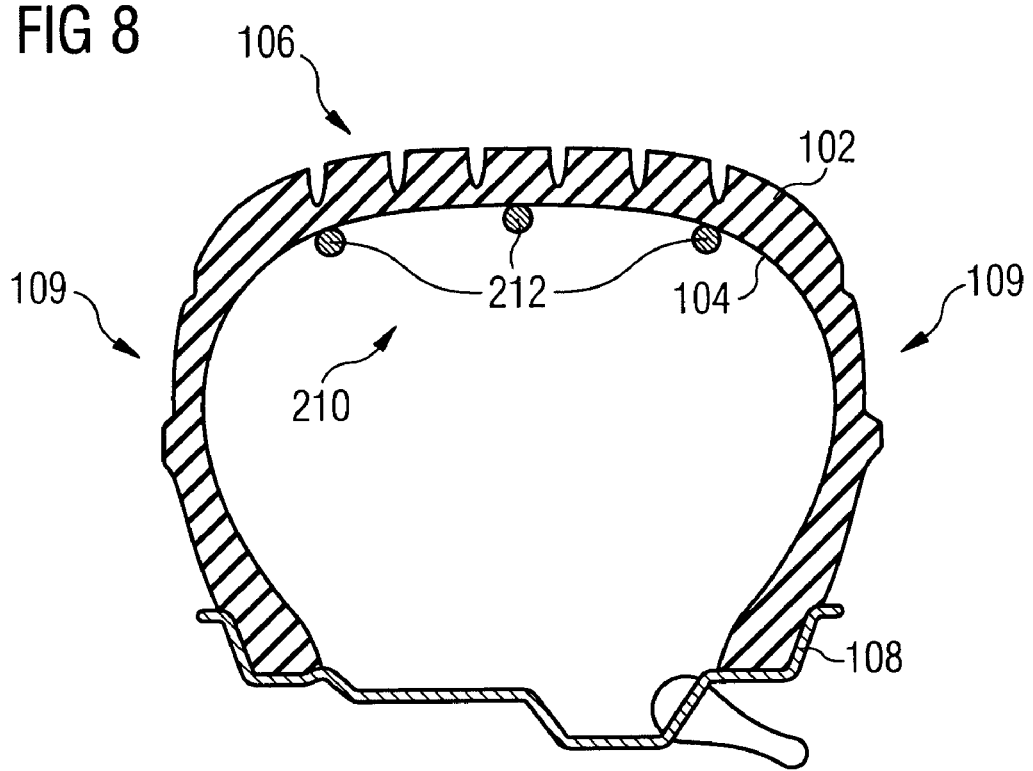
FIG. 8 depicts a cross-section of a tire according to an embodiment of the invention.
Figure 9:
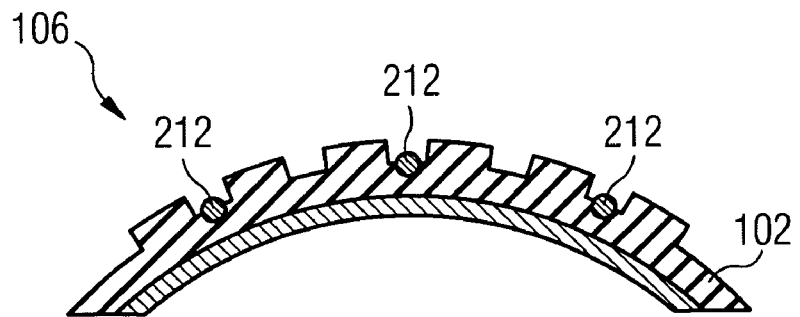
FIG. 9 is a detail view of a tread portion of a tire according to an embodiment of the invention.

Referring now to FIG. 8, another embodiment of a deformation detection structure 210 is depicted. Deformation detection structure 210 comprises at least one optical waveguide structure 212 mounted along the circumference of tire 102. In the embodiment depicted in FIG. 8, three optical waveguide structures 212 are mounted to inner portion 104 of tire 102. In FIG. 9, which is a detail view of tread area 106 of tire 102, another embodiment of deformation detection structure 210 is depicted, in which at least one optical waveguide structure 212 is embedded within tread area 106, external to tire 102.

In either the embodiment of FIG. 8 or FIG. 9, deformation detection structure 210 can comprise more or fewer than the three depicted individual optical waveguide structures 212. Optical waveguides 212 can be mounted to tire 102 after the molding process or optionally be integrated into the tire material itself. In various embodiments, optical waveguides 212 can comprise glass, polymers, or other materials or composites suitable to withstand strain in tire 102.

Figure 10:
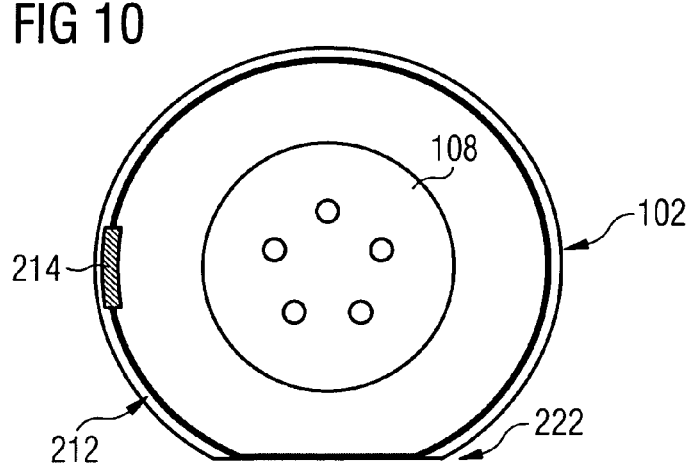
FIG. 10 depicts a side view of a tire according to an embodiment of the invention.
Figure 11:
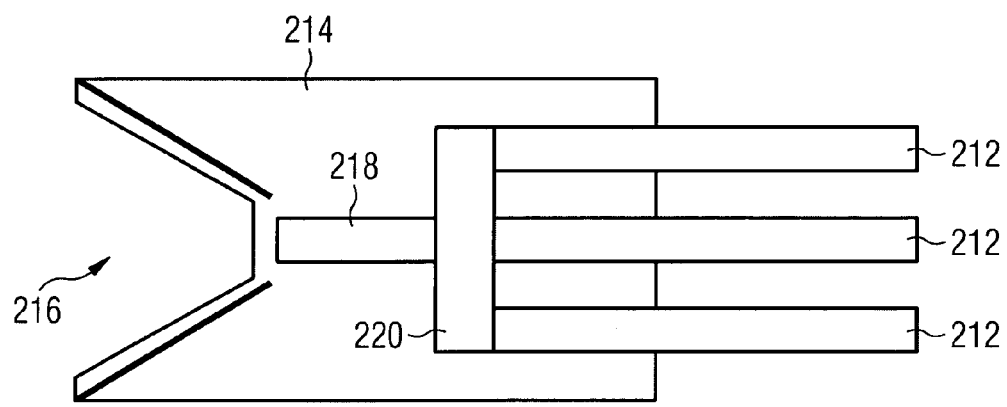
FIG. 11 depicts an optical coupler and detector according to an embodiment of the invention.

Referring to FIGS. 10 and 11, optical waveguide structures 212 further comprise an integrated optical coupler and detector (coupler/detector) 214. In one embodiment, coupler/detector 214 comprises a molded interconnected device (MID) for the coupling of light into one or more optical waveguides 212. Coupler/detector 214 comprises a light source input 216, a waveguide coupling 218, and a beam splitter 220 in one embodiment. Beam splitter 220 can also extract a reference beam for analysis.

Figure 12:
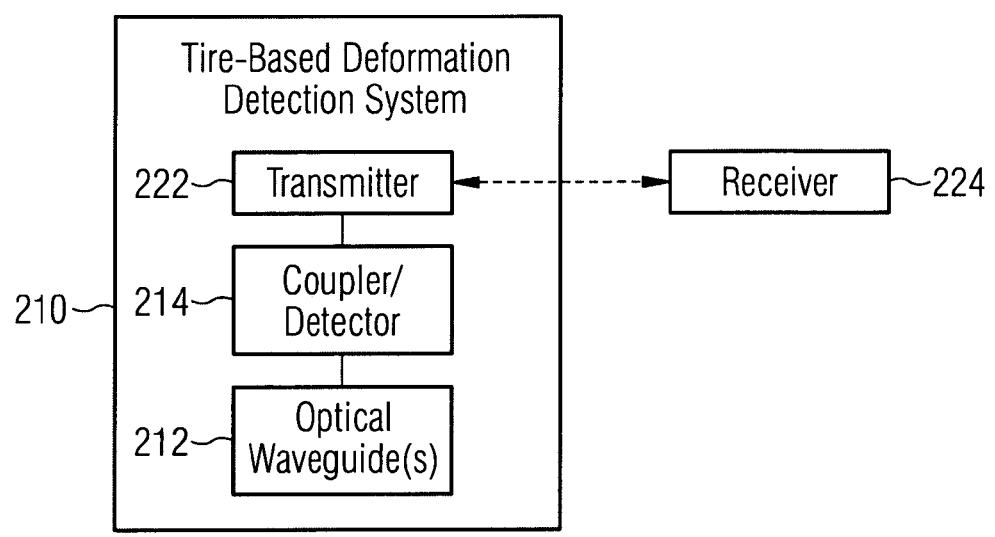
FIG. 12 depicts a block diagram according to an embodiment of the invention.

Referring to FIG. 12, and similar to FIG. 6 described above, deformation detection system 210, based in one or more vehicle tires, such as tire 102, includes one or more optical waveguide structures 212 coupled to coupler/detector 214. Coupler/detector 214 is coupled to or integral with a transmitter 222, such as a radio frequency (RF) or other suitable transmitter, adapted to communicate with a receiver 224 located external to tire 102. For example, and similar to FIG. 7 described above, receiver 224 can be mounted in a vehicle and adapted to communicate with detection systems 210 in a one, some, or all vehicle tires. In other embodiments, receiver 224 can be mounted external to a vehicle. When a signal is received by receiver 224 from coupler/detector 214 reporting deformation or some other condition related to tire 102, receiver 224 can in turn alert a driver or operator via a dashboard indicator or other visual or audible warning.

In operation, the amplitude or phase of light in each optical waveguide 212 will be changed according to mechanical deformations of tire 102. Referring again to FIG. 10, changes in optical waveguide structure 212 can be seen in a footprint area 222 of tire 102, due to normal loading and usage. Distortion or bending of optical waveguide 212 changes the wave-guiding properties. From a reference signal comparison, these changes can be detected by standard optical techniques using, for example, photodiodes (PSD). Detected differences in phase, amplitude, transmission, reflection, attenuation, runtime effects, and other characteristics in traveling waves passing through optical waveguides 212 can be related to and used to detect and locate a mechanical deformation of waveguide 212 and therefore also tire 102. To improve detectability, modulated or pulsed signals initiated by light source 216 can be used.

Optical waveguides 212, either at the tread region (FIG. 9) or at the inner liner (FIG. 8) of tire 102, enable the measurement and monitoring of important parameters such as load, tire pressure, contact area, tire wear, tread profile, and slip angle, among others. From detection and analysis of local tire deformation, conclusions can also be drawn on the current road composition and conditions, such as relatively smooth pavement, cobblestone pavement, or gravel. By using multiple waveguides as depicted in FIGS. 8 and 9, a two-dimensional resolution of mechanical deformations can be achieved. Thus, tire forces and deformations in two dimensions can be measured, enabling detection of steering angle and slip angle of tires for advanced chassis control.

Embodiments of the invention provide deformation detection structures that can be mounted to or embedded within vehicle tires to detect tire deformation and monitor and measure other parameters related to vehicle usage, road conditions, and tire condition. Various embodiments of the invention can therefore provide accurate and reliable real-time information to passenger and vehicle safety.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A tire deformation detection system comprising:
    a deformation detection structure mounted in a tire and configured to detect mechanical deformation of the tire, wherein the deformation detection structure comprises at least one stress detection array coupled to a sensor;
    a transmitter configured to transmit data related to the mechanical deformation; and
    a receiver configured to receive the data.

2. The system of claim 1, wherein the deformation detection structure further comprises a detector layer, wherein the at least one stress detection array and the sensor are mounted on a detector layer, and wherein the detector layer is configured to be adhesively affixed to an internal surface of the tire.

3. The system of claim 1, wherein the at least one stress detection array comprises a plurality of load structures.

4. The system of claim 3, wherein each of the plurality of load structures comprises one of a parallel resistive circuit and a series resistive circuit.

5. The system of claim 3, wherein each of the plurality of load structures is configured to deform in response to a mechanical deformation of the tire.

6. The system of claim 5, wherein each of the plurality of load structures is configured to permanently deform in response to a mechanical deformation of the tire.

7. The system of claim 5, wherein the sensor is configured to detect a change in the at least one stress detection array related to a deformation of at least one of the plurality of load structures.

8. The system of claim 7, wherein the change comprises a resistance of the at least one stress detection array.

9. The system of claim 1, further comprising an alert system configured to provide an indicator related to the data.

10. A tire deformation detection system comprising:
    a deformation detection structure mounted in a tire and configured to detect mechanical deformation of the tire, wherein the deformation detection structure comprises at least one optical waveguide mounted along a circumference of the tire coupled to an integrated optical coupler and detector configured to detect a change in light in the at least one optical waveguide in response to a mechanical deformation of the tire;
    a transmitter configured to transmit data related to the mechanical deformation; and
    a receiver configured to receive the data.

11. The system of claim 10, wherein the integrated optical coupler and detector comprises:
    a light source input;
    a beam splitter coupled to the at least one optical waveguide; and
    a waveguide coupler arranged between the light source input and the beam splitter.

12. The system of claim 11, wherein the light source is configured to initiate at least one of a modulated signal and a pulsed signal.

13. The system of claim 10, wherein the change in light comprises at least one of a change in amplitude, phase, transmission, reflection, attenuation, and runtime effect.

14. The system of claim 10, wherein the integrated optical coupler and detector comprises a molded interconnect device.

15. The system of claim 10, wherein the at least one optical waveguide is affixed to an interior surface of the tire.

16. The system of claim 10, wherein the at least one optical waveguide is affixed to a tread portion of the tire.

17. A mechanical deformation detection apparatus comprising:
    a deformation detector affixed along at least a portion of a circumferential length of a tire and adapted to change in response to a deformation of the tire; and
    a sensor coupled to the deformation detector and adapted to sense the change of the deformation detector.

18. The apparatus of claim 17, wherein the deformation detector comprises a plurality of interconnected resistors configured to break in response to the deformation, and wherein the sensor is adapted to sense a change in resistance.

19. The apparatus of claim 17, wherein the deformation detector comprises an optical waveguide, and wherein the sensor comprises an optical detector adapted to sense a change in light passing through the optical waveguide.

20. The apparatus of claim 17, further comprising a transmitter adapted to transmit signals related to the change sensed by the sensor.

21. A method of detecting a deformation of a tire comprising the steps of:
   providing a detector configured to deform in response to a mechanical deformation of the tire;
   sensing a deformation of the detector; and
   outputting a signal related to the deformation sensed.

22. The method of claim 21, wherein the step of providing a detector further comprises the steps of:
   providing a detector comprising a plurality of interconnected load structures arranged in at least one array on a detector layer; and
   affixing the detector to the tire.

23. The method of claim 22, wherein the step of sensing a deformation further comprises sensing a change in resistance of the at least one array caused by a breakage of at least one of the load structures in response to the deformation.

24. The method of claim 21, wherein the step of providing a detector further comprises the steps of:
   providing a detector comprising an optical waveguide coupled to an optical coupler/detector comprising a light source; and
   mounting the detector along a circumference of the tire.

* * * * *